United States Patent [19]
Bridwell et al.

[11] 3,774,707
[45] Nov. 27, 1973

[54] HYDRAULICALLY POWERED DRIVE & STEERING SYSTEM FOR TRACK TYPE VEHICLE

[75] Inventors: John W. Bridwell, Peoria; Kenneth R. Lohbauer, Joliet, both of Ill.

[73] Assignee: Caterpillar Tractor Co., Peoria, Ill.

[22] Filed: Dec. 27, 1971

[21] Appl. No.: 212,125

[52] U.S. Cl. ............................................ 180/6.48
[51] Int. Cl. .......................................... B62d 11/04
[58] Field of Search ................. 180/6.48; 60/53 R, 60/97 E

[56] References Cited
UNITED STATES PATENTS
3,677,362  7/1972  Chatterjea ......................... 180/6.48
2,941,365  6/1960  Carlson ........................... 60/53 R X
3,210,122  10/1965  Moon ............................. 180/6.48 X Primary Examiner—Kenneth H. Betts
Assistant Examiner—John A. Pekar
Attorney—Freling E. Baker

[57] ABSTRACT

A hydraulic circuit to provide power and steering functions for a track type vehicle wherein a pair of reversible fluid motors coupled to the track assemblies are individually driven by a separate fluid pump and the speed and direction of the motors is controlled by a pilot operated system. Control of the pilot system is accomplished by two interconnected pilot control circuits including a first pilot circuit for controlling the speed and direction of both motors and a second pilot control circuit for selectively individually controlling the speed and direction of the fluid motors to provide steering functions for the vehicle.

8 Claims, 3 Drawing Figures

HYDRAULICALLY POWERED DRIVE & STEERING SYSTEM FOR TRACK TYPE VEHICLE

BACKGROUND OF THE INVENTION

Many different types of systems have been employed in the past to transfer the power of an engine to the track units of a track type vehicle. These fall mainly into two broad classifications, mechanical systems and hydraulic or hydrostatic systems. The mechanical systems include a plurality of gears, shafts and clutches in order to transfer the power of the engine to the track units. Most of the mechanical systems use a brake, or brake and clutch combination, to lock one of the track units while the other track unit turns to provide a steering function for the vehicle. These mechanical systems necessarily use a large number of parts and a large amount of energy is wasted during braking of one track member during a steering operation.

The hydraulic or hydrostatic systems for propelling track type vehicles normally employ variable fluid pumps and motors for converting the mechanical energy of the engine into fluid energy to drive the track units. These hydraulic units are generally less complicated and bulky than mechanical drive units since many of the gears and shafts of the mechanical units are eliminated. Many of the prior art hydraulic units provide an individual hydraulic motor for each track unit and steering is accomplished by merely changing the speed of one hydraulic motor relative to the speed of the other one. However, often times the controls for the hydraulically powered units are complicated and require much of the operator's attention and effort to drive and steer the vehicle which detracts from the more important control of the implements on the vehicle.

SUMMARY AND OBJECTS OF THE INVENTION

Accordingly, it is an object of this invention to overcome the above briefly described problems by providing a hydraulically powered drive and steering system for a track type vehicle which is easily operated with a minimum of effort.

It is another object of this invention to provide a drive and steering system incorporating a dual pilot control system in which one pilot system controls forward and reverse motion of a vehicle and the other pilot system alters the first pilot system signal to control steering of the vehicle.

It is another object of this invention to provide a drive and steering system which affords optimum responsiveness and utilization of the power output of the vehicle engine.

Other objects and advantages of the present invention will become more readily apparent upon reference to the accompanying drawings and following description.

DESCRIPTION OF THE PREFERRED EMBODIMENT

Figure 1:
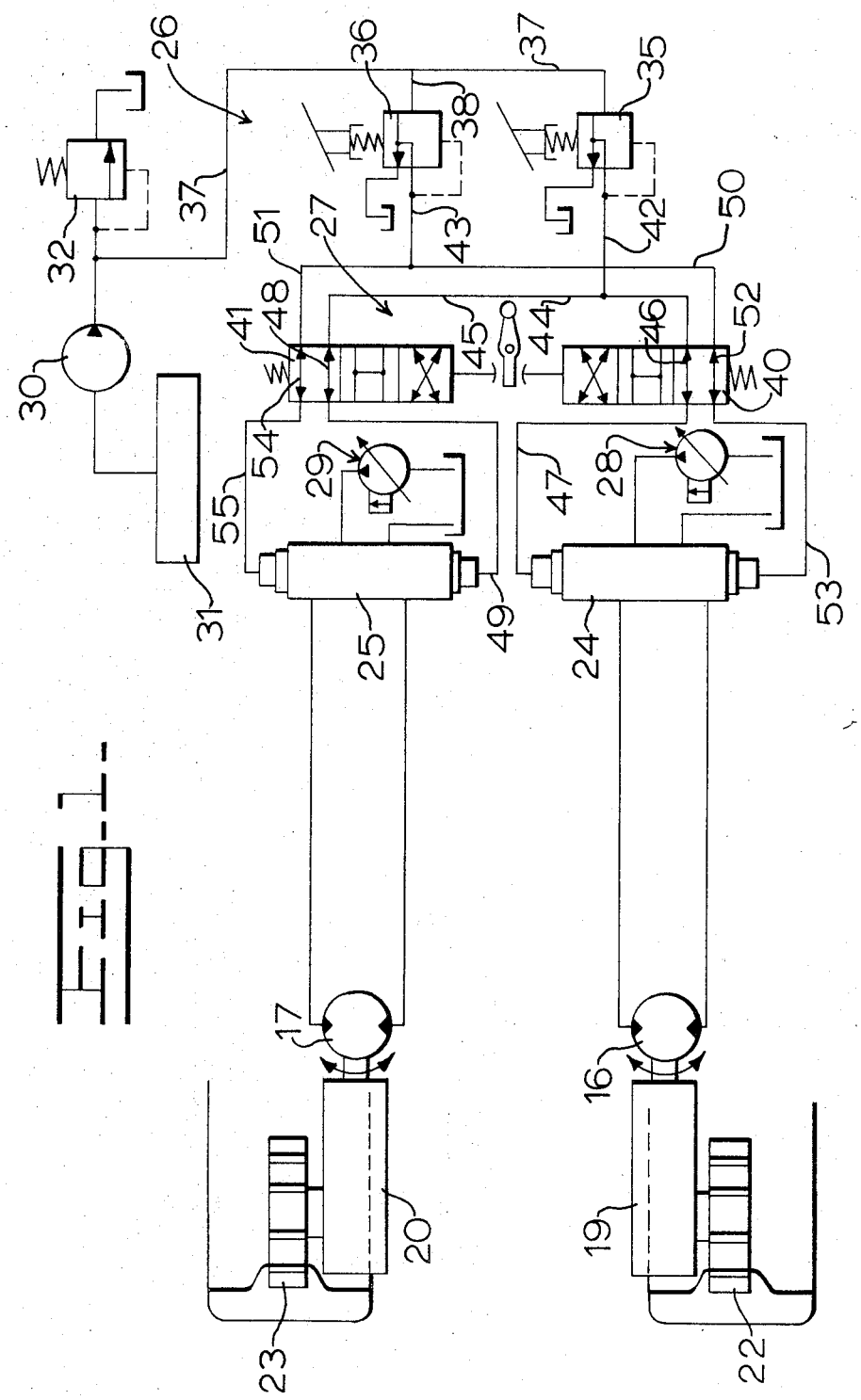
FIG. 1 is a schematic circuit diagram of a hydraulic drive and steering system embodying the principles of the subject invention.

A schematic diagram of a hydraulic drive and steering system embodying the principles of the present invention is shown in FIG. 1. The system is used basically to control the speed and direction of two hydraulic drive motors 16 and 17. The motors are coupled such as by means of sprocket assemblies 19 and 20 which drive track assemblies 22 and 23, respectively. A pair of main fluid directing control valves 24 and 25 control the flow of fluid to the motors and two pilot control circuits 26 and 27 are operative to control the main control valves. The system includes two main supply pumps 28 and 29 and a pilot supply pump 30. A reservoir 31 provides a supply of fluid for pump 30 and a relief valve 32 controls the maximum pressure in the pilot circuits 26 and 27.

The pilot control circuit 26 includes a pair of directional pilot valves 35 and 36 which are in fluid communication with the pump 30 by means of lines 37 and 38 and are operative to determine the direction of rotation of the drive system. Pilot control circuit 27 includes steering pilot valves 40 and 41 which are situated between directional pilot valves 35 and 36 and main control valves 24 and 25 and are operative to control steering of the vehicle. The system further includes a pair of pilot lines 42 and 43 leading from valves 35 and 36 which respectively pass through valves 40 and 41.

The pilot line 42 divides into two separate pilot lines 44 and 45 with line 44 leading to valve 40 and line 45 leading to valve 41. A straight through passage 46 in valve 40 connects line 44 with a line 47 which leads to one end of main control valve 24. In the same manner, a straight through passage 48 in valve 41 connects line 45 with a line 49 which leads to one end of main control valve 25. Pilot line 43 also divides into lines 50 and 51 with line 50 leading to valve 40 and line 51 leading to valve 41. A straight through passage 52 in valve 40 connects line 50 with a line 53 which leads to one end of main control valve 24 and a straight through passage 54 in valve 41 connects line 51 with a line 55 which leads to one end of main control valve 25. These valves 40 and 41 are operative to alter the pilot control system initiated by either of the directional control valves 35 and 36 to effect steering of the drive system.

Although the pilot valves 40 and 41 are shown schematically as three position valves, the actual valves are constructed as spool valves with modulation capabilities. Therefore, the shift from one position of the valves to the other positions can be accomplished gradually rather than abruptly as would be suggested by the schematic illustration of the valves. A detailed description of the valve construction will be given at a later point in the description with particular reference to FIG. 3 of the drawings.

Figure 2:
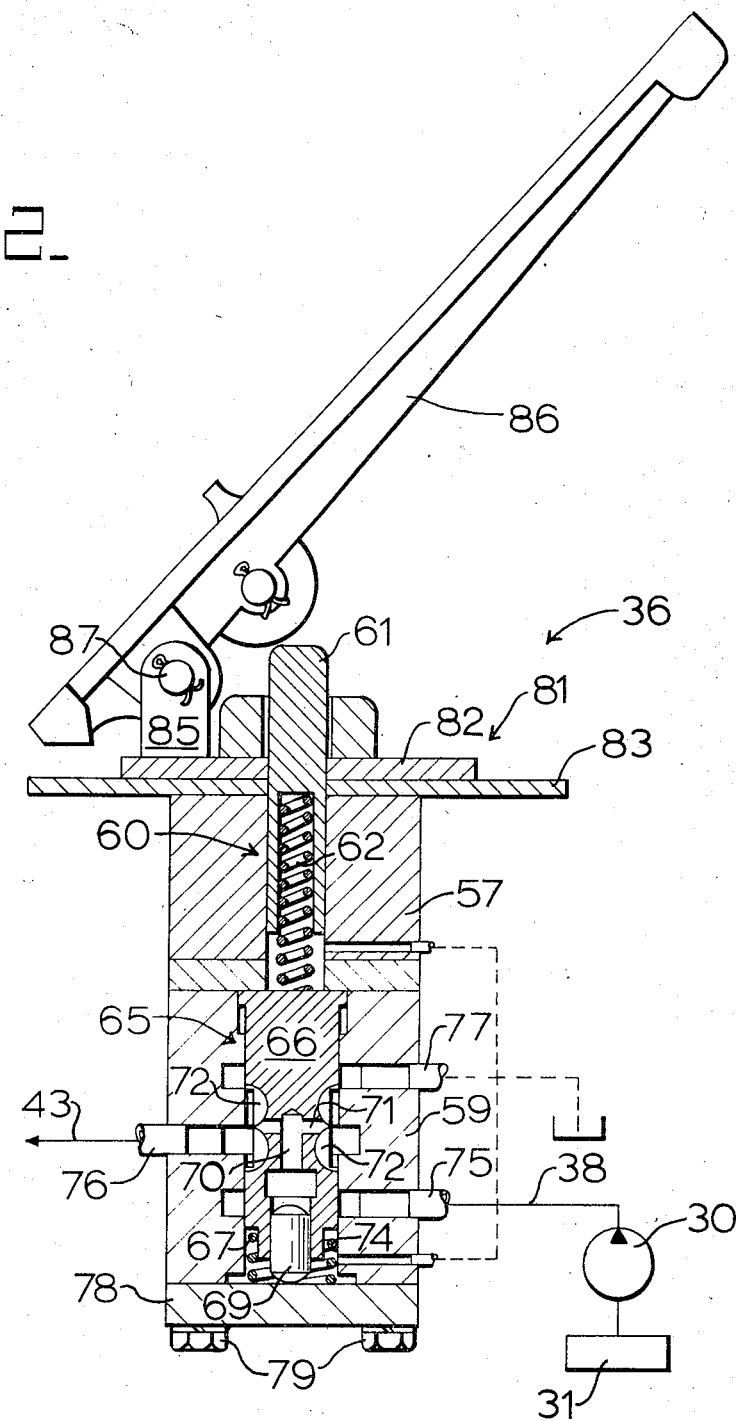
FIG. 2 is an elevational view in section of one of the pilot directional valves of the subject invention; and, FIG. 3 is a view in section of the pilot steering valves of the subject invention shown in conjunction with a portion of the related circuit in schematic form.

The actual construction of directional pilot valve 36 is shown in FIG. 2. Since pilot valves 35 and 36 are identical in construction, only a description of valve 36 will be given. Elements which are identical to those shown in the schematic illustration, FIG. 1, have been identified by the same reference numerals. These include the reservoir 31, the pump 30 and line 38 leading into the pilot valve 36.

The valve 36 includes an upper housing 57, an intermediate separating plate 58, and a lower housing 59. Situated within the upper housing is a plunger assembly 60 which includes a pin member 61 and a spring 62. Situated within the lower housing 59 is a spool assembly 65 which includes a spool 66, a spring 67, and a slug member 69. The spool 66 contains two drilled passages 70 and 71 and a plurality of metering slots 72. The spool 66 is situated within a bore 74 of the housing 59 and an inlet port 75 and two outlet ports 76 and 77 penetrate the housing 59 and intersect the bore 74. An end cap 78 fastens to the housing 59 by a plurality of cap screws 79 and seals the bore 74.

Forming a further portion of the valve 36 is a mounting assembly 81 including plates 82 and 83 and a pin guide 84. A bracket 85 is fastened to plate 82 and a foot pedal 86 is pivotally attached to bracket 85 by a pin 87.

The construction of the pilot control circuit 27 which includes valves 40 and 41 will be described with particular reference to FIG. 3 of these drawings. Although the valves 40 and 41 are shown in the schematic illustration of FIG. 1 as being separate valves, as can be seen with reference to FIG. 3, they are contained within a common housing 89. The valve 40 includes a spool 90, a first spring 91 and retainer 92, and a second spring 93 and retainer 94. The spool 90 reciprocates within a bore 96 of the housing 89 in order to control flow of pilot fluid to the main control valve 24. Metering slots 97 in the spool 90 allow for precise metering of pilot fluid to the control valve 24.

Valve 41 also includes a spool 98, a first spring 99 and retainer 100, and a second spring 101 and retainer 102. Spool 98 reciprocates in a bore 104 of the housing 89 to control flow of pilot fluid to the control valve 25. Spool 98 also has a plurality of metering slots 105 which allow for precise metering of the pilot fluid to the control valve 25.

A control lever 106 is fastened to a pivotally mounted spool actuating member 107. A first portion 108 of member 107 is in contact with spool 90 and a second portion 109 is in contact with spool 98. As viewed in FIG. 3, when the control lever is moved to the right, spool 98 is actuated and when the control lever is moved to the left, spool 90 is actuated. Actuation of spool 90 has no effect on spool 98 and, likewise, actuation of spool 98 has no effect on spool 90. In other words, the spools are independently actuable.

Pilot line 42 leading from valve 35 is in communication with chambers 112 and 113 of the valve housing 89. With spools 90 and 98 in the non-activated position as shown, chamber 113 is blocked by the two spools. Chamber 112, however, is in free communication across the spools 90 and 98 with lines 47 and 49 to the main control valves 24 and 25. In a similar manner, pilot line 43 leading from valve 36 is in communication with chamber 114 which is in free communication with lines 53 and 55 leading to the main control valves 24 and 25. With spools 90 and 98 in the position shown, chamber 114 is blocked by the spools from communicating with lines 47 and 49.

OPERATION

While the operation of the present invention is believed clearly apparent from the foregoing description, further amplification thereof will subsequently be made in the following brief summary of such operation.

When the machine operator desires to drive the machine in a forward or reverse direction, the first pilot control circuit 26 is used for this purpose. This circuit includes the forward direction pilot valve 35 and the reverse direction pilot valve 36. When the operator activates the pilot valve 35, pilot fluid flows from the pilot pump 30 to one end of each of the main control valves 24 and 25. These main control valves are thereby shifted by the pilot pressure so that the main working fluid from pumps 28 and 29 can reach the track motors 16 and 17. The motors then power the gear and sprocket assemblies 19 and 20 which in turn rotate the track assemblies 22 and 23 in a forward dirction.

The speed at which the motors 16 and 17 are rotated is determined by the distance that the spools of control valves 24 and 25 are moved, which determines the amount of pressurized fluid delivered to the motors by the pumps 28 and 29. The distances that the spools of the main control valves are moved is determined by the amount of pilot pressure which in turn is controlled by modulation of valve 35 by the operator. The amount of pilot pressure established by valve 35 is determined by the force applied through spring 62 to spool 66 within the valve. Spool movement, of course, is determined by the pressure applied to the plunger assembly 60 by the foot pedal 86 under the control of the machine operator. Precise modulation of the spool 66 is possible in view of the metering slots 72 in the spool. Therefore, as the operator presses the foot pedal 86 farther downward, a higher pilot pressure is established by the pilot valve 35 and thereby shifts the spools in main control valves 24 and 25, which allows more pressurized fluid from pumps 28 and 29 to reach the motors 16 and 17. The speed of the motors 16 and 17, and therefore of the total machine, is a function of the distance that the foot pedal 86 is moved by the machine operator.

Motion of the machine in a reverse direction is accomplished in a similar manner using the pilot valve 36. Actuation of this valve allows pilot fluid to flow directly across the two steering valves 40 and 41 to reach the opposite ends of main control valves 24 and 25. The spools in these two main control valves are then shifted in a direction to communicate fluid from pumps 28 and 29 to opposite sides of motors 16 and 17, thereby driving the track assemblies 22 and 23 in a reverse direction.

As is evident, up to this point, the two pilot steering valves 40 and 41 have remained inactive and have had no effect on the motion of the machine in a forward or reverse direction. For turning or steering of the machine while it is being driven in a forward or reverse direction, one or the other of the steering pilot valves 40 or 41 is activated to alter the pilot signal coming from the directional pilot valve 35 or 36.

Figure 3:
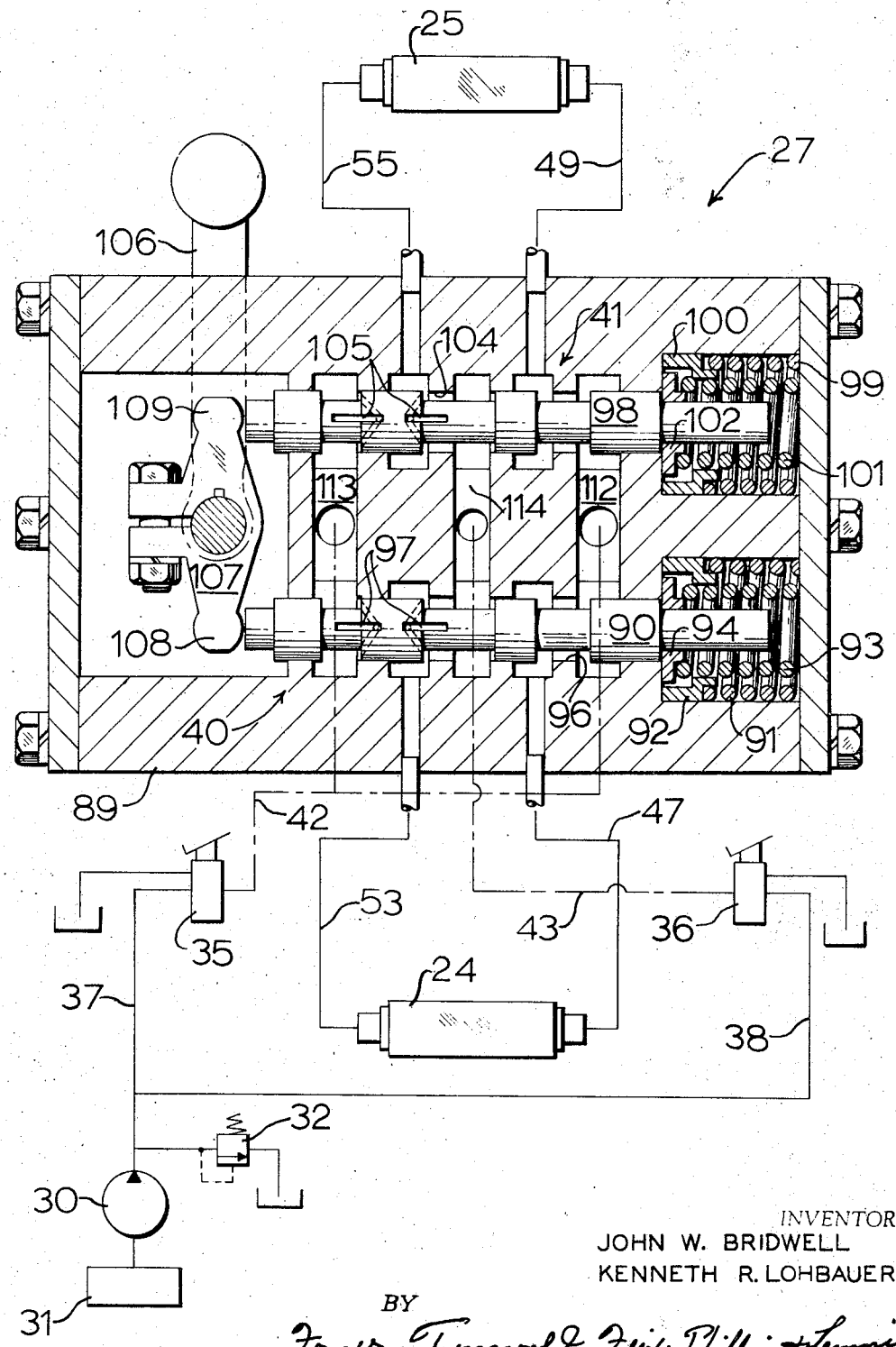

With particular reference to FIGS. 1 and 3 of the drawings, a turning or steering sequence is as follows. With the directional valve 35 activated and the machine moving in a forward direction, as previously described, pilot steering valve 40 is activated to cause the machine to turn or steer to the left. This is accomplished essentially by slowing down the speed of the motor 16 relative to the speed of the motor 17. To do this, the operator moves the control lever 106 to the left as viewed in FIG. 3 which causes the spool 90 to be moved to the right. As the spool moves to the right, the pilot fluid in chamber 113 begins to communicate with line 53 by means of metering slots 97. This pilot fluid in line 53 attempts to shift the spool in main control valve 24 to the right. As the pilot pressure in line 53 increases, the spool in the main control valve begins to shift to the right which decreases the amount of main hydraulic fluid reaching motor 16. This, of course, decreases the speed of motor 16 and likewise the speed of the track assembly 22. With the speed of motor 16 decreased gradually, the machine travels in a slightly turning direction to the left.

To make a sharper turn to the left, the operator moves the control lever 106 farther to the left which, of course, moves the spool 90 farther to the right and thereby communicates more pilot fluid to the left side of the main control valve 24. As the pilot pressure in line 53 approaches the pilot pressure in line 47, the speed of motor 16 continues to decrease until the motor completely stops when the pressures in line 53 and 47 are equalized. This means that the spool in valve 24 has been shifted to a neutral or non-communicating position. With the motor 16 completely stopped and motor 17 continuing to turn, a pivot turn in obtained.

Still farther movement of spool 90 to the right causes the spool to block communications between chamber 112 and line 47 but allows communication bewteen chamber 113 and line 53. This causes the motor 16 and track assembly 22 to be rotated in a reverse direction to effect a spot turn since track 22 is rotating in the direction opposite of track 23. As soon as the operator has completed his turning or steering operation, he merely releases the control lever 106 and the spool 90 is moved to the original neutral position by the springs 91 and 93 and spring retainers 92 and 94. If, at this time, pilot valve 35 is still activated, the machine once again assumes a forward direction movement.

When the operator decides to make a right turn, he moves the control lever 106 to the right as viewed in FIG. 3 and spool 98 is likewise moved to the right. This affects the main control valve 25 in a similar manner previously described for control valve 24. A gradual, relatively long radius power turn, a pivot turn or a spot turn can be performed by controlling the amount of movement of the spool 98. Once again when the operator has completed his right turn, he merely releases the control lever 106 and the springs 99 and 101 and spring retainers 100 and 102 return the spool 98 to a neutral position.

Steering or turning of the machine while the machine is traveling in a reverse direction is very similar to the procedure just described. However, in order for the machine to travel in a reverse direction, pilot valve 36 is activated, which causes pilot fluid to flow into line 43, chamber 114, and lines 53 and 55. This causes the spools in valves 24 and 25 to move to a fluid communicating position such that motors 15 and 17 and track assemblies 22 and 23 are rotated in a reverse direction.

Right and left turns can be effected by appropriate manipulation of control lever 106 in the same manner as that described above when the machine is traveling in a forward direction.

In view of the foregoing, it is readily apparent that the structure of the present invention provides an improved and simplified control system for driving and steering a track type vehicle. Such an improved and simplified control system is possible through the incorporation of dual pilot control circuits which use a single source of pilot fluid. While the invention has been described and shown with particular reference to the preferred embodiment, it will be apparent that variations might be possible that would fall within the scope of the present invention which is not intended to be limited except as defined in the following claims.

What is claimed is:

1. A hydraulic system for controlling a pair of reversible hydraulic motors operatively connected to power a vehicle comprising:
   a source of pressurized fluid for driving a pair of hydraulic motors;
   main fluid directing means operatively connected to selectively direct pressurized fluid from said source to said motors for forward or reverse drive thereof;
   first pilot control means including a source of pilot fluid operatively connected to control said main fluid directing means which is operative to control the flow of fluid to and from said motors and is thus operative for simultaneously controlling the speed and direction of said driven motors; and,
   second pilot means operatively connected intermediately of said first pilot control means and said main fluid directing means effective upon selective manipulation to alter said control between said first pilot control means and said main fluid directing means to control said fluid directing means and thereby control the fluid flow to said motors to control the speed of a selected one of said driven motors.

2. The hydraulic system of claim 1 wherein said first pilot control means comprises first and second directional pilot valves hydraulically connected between said source of pilot fluid and said main directing means for selectively controlling fluid flow from said pilot fluid source to said main directing means.

3. The hydraulic system of claim 2 wherein said main fluid directing means comprises first and second variable position pilot actuated fluid control spool valves which are both simultaneously actuated into a fluid directing position by actuation of either one of said first and second directional pilot spool valves for directing fluid from said first fluid supply source to said driven motors.

4. The hydraulic system of claim 5 wherein said first fluid supply source comprises a pair of fluid pumps hydraulically connected to said main fluid directing means such that one of said pair of pumps connects to said first variable position pilot actuated fluid control spool valve, the other of said pair of pumps connects to said second variable position pilot actuated fluid control spool valve so that actuation of said first variable position pilot actuated fluid control spool valve directs fluid from said one of said pair of pumps to one of said pair of driven motors, and actuation of said second variable position pilot actuated fluid control spool valve directs fluid from said other of said pair of pumps to the other of said pair of driven motors.

5. The hydraulic system of claim 1 wherein said second pilot control means comprises first and second steering pilot spool valves, and a single control lever operatively connected to independently actuate both of said first and second steering valves.

6. A hydraulically powered drive and steering system for a track type vehicle in which a pair of machine supporting track assemblies are individually powered by separate reversible fluid motors comprising:
   a pair of reversible hydraulic motors;
   a pair of power supply pumps each separately connected to drive one of said motors; pair
   a pilot fluid supply pump;

a power circuit including a pair of fluid directing control valves operative to selectively direct fluid to said motors for forward or reverse drive thereof;

a pilot control circuit operatively connected for directing pilot fluid from said pilot pump to actuate said fluid directing control valves to a fluid directing position; and, a steering control means operatively connected in said pilot control circuit for selectively altering pilot control pressure in said pilot control circuit to a selected one of said fluid directing control valves to thereby shift said valve independent of the other of said fluid directing control valves to effect steering of the drive system.

7. The drive and steering system of claim 6 wherein said pilot control circuit includes a pair of manually operable directional pilot control valves operatively connected to that actuation of either of said directional pilot valves actuates both of said air of fluid directing control valves to effect simultaneous forward or reverse of said motors.

8. The drive and steering system of claim 7 wherein said steering control means includes a pair of manually operable steering pilot valves, reciprocally mounted in separate bores in a single valve housing, and a single control lever mounted on said housing and operative for selectively activating either of said steering pilot valves.

* * * * *